Patented Mar. 10, 1936

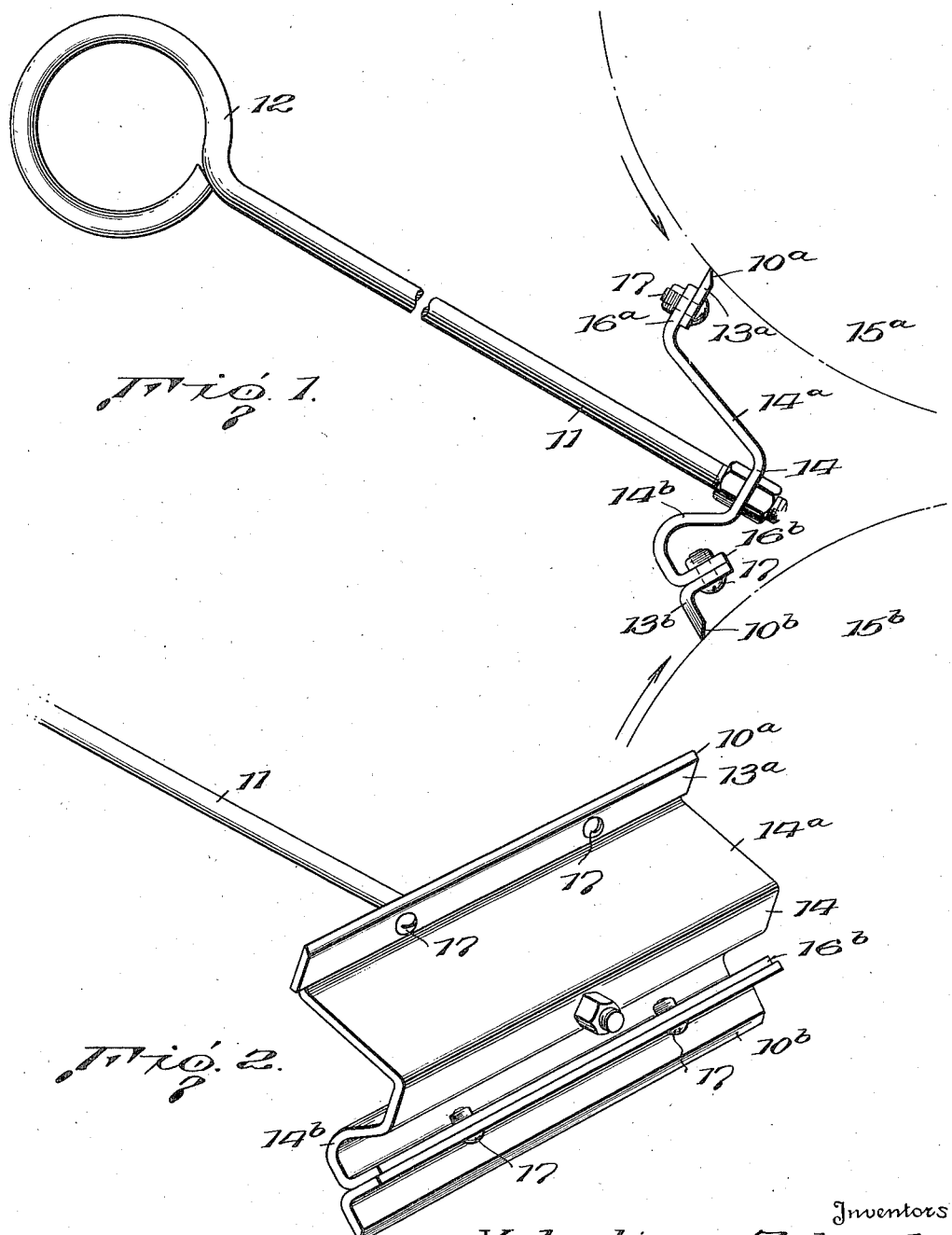

2,033,801

UNITED STATES PATENT OFFICE 2,033,801

ROLL SCRAPING TOOL

Valentine Zehender and Charles Latour, New Orleans, La.

Application August 20, 1934, Serial No. 740,694

2 Claims. (Cl. 15—105)

This invention relates to tools or appliances for cleaning the peripheral surfaces of juxtaposed rolls and particularly to a tool for cleaning the surfaces of the revolving rolls between which dough is passed in dough handling machinery.

It is, of course, necessary, when cleaning the surfaces of such rolls to remove the particles of dough in such fashion that they will not pass between the rolls. In other words, the dough must be scraped from the rolls at a point where these surfaces are moving toward each other. Under such circumstances, there is grave danger of injury to the operator. In fact, there have been numerous accidents under such conditions, operators often having their hands badly mashed and oftentimes losing one or more fingers and sometimes a hand.

The primary object of this invention, therefore, is to provide a tool with which a person can clean revolving rolls, such as the presser rolls of dough handling machinery, with the maximum degree of safety so far as concerns injury to, or loss of, their fingers and hands.

A further object is to provide a tool of this character which will permit both of two juxtaposed rolls to be cleaned simultaneously.

Another object is to provide a cleaning tool of this type provided with scraping edges that are detachable and can, therefore, be readily renewed.

With these and other objects in view, the invention consists in certain details of construction and combinations and arrangements of parts, all as will hereinafter be more fully described and the novel features thereof particularly pointed out in the appended claims.

In the accompanying drawing, illustrating the preferred embodiment of the present invention, Figure 1 is a side elevation of the tool positioned against the peripheral surfaces of two juxtaposed rolls, the latter being shown diagrammatically; and Fig. 2 is a perspective view of the tool.

The tool is provided with two elongated scraping edges $10^a$, $10^b$, at opposite side edges of a plate 14 secured to a staff 11 provided with a hand grip portion 12. The scraping edges $10^a$, $10^b$, are beveled and in order to permit renewal of said edges, instead of discarding the tool, when said edges have become excessively worn, said edges are formed by elongated plates $13^a$, $13^b$, detachably secured to plate 14. This feature of separable or detachable scraping members is not, however, absolutely necessary.

The two edges $10^a$, $10^b$, are adapted to simultaneously engage the peripheries of the two rolls $15^a$, $15^b$, and in order that the staff will be positioned at an angle to a plane forming a common tangent to the merging surfaces of the two rolls, said plate 14 has the staff secured to the base thereof and the two sides $14^a$, $14^b$, of said plate are made of unequal height. At their edges, the sides are offset or provided with lateral extensions, side $14^a$ having an offset edge portion $16^a$ and side $14^b$ having an offset portion $16^b$. Where the scraping edges are to be renewable, as before mentioned, scraper plates $13^a$, $13^b$, are secured to said offset portions $16^a$, $16^b$, respectively, as by bolts 17.

As just mentioned, the inclination of portions $16^a$, $16^b$, with respect to their respective sides $14^a$, $14^b$, is such that when the scraping edges are pressed against the surfaces of the two rolls the line of pressure applied through the handle is directed toward the surface of one of the rolls and not in a plane forming a common tangent to the surfaces of the two rolls. However by reason of the tool engaging the two rolls simultaneously, there is little, if any, danger of the tool slipping between the rolls. Furthermore, the length of staff 11 insures absolute protection for the worker's hands.

The plates 14, $13^a$, $13^b$ are somewhat elongated in order to clean an appreciable area, lengthwise of the rolls at each application of the tool. It will be appreciated, however, that the plate 14 need not necessarily be as long as plates $13^a$, $13^b$, as a slight resiliency at the ends of plates $13^a$, $13^b$ will not be harmful. However, it is preferred to have each of said scraper plates backed or reinforced throughout their length.

As will be appreciated, the present tool greatly facilitates cleaning of the peripheral surfaces of two revolving, juxtaposed rolls at a point where the particles removed will fall clear of the rolls. The two rolls can be cleaned simultaneously and the operator's hands absolutely protected against injury.

What is claimed is:

1. A tool for cleaning the peripheral surfaces of juxtaposed rolls, comprising a handle, a V-shaped plate, means for securing said plate on said handle at a point in the recess formed by the sides of said plate, one of said sides being of less height than the other, and scraping edges carried by each side of said plate.

2. A tool for cleaning the peripheral surfaces of juxtaposed rolls, comprising a handle, an elongated plate disposed transversely of said handle, the elongated edge portions of said plate being provided with beveled scraping edges engageable against the peripheries of said rolls, one of said edge portions being disposed at an acute angle to said handle and the other edge portion being disposed at substantially right angles to said handle.

VALENTINE ZEHENDER.
CHARLES LATOUR.